United States Patent Office 3,051,750
Patented Aug. 28, 1962

3,051,750
NITROSATION PROCESS
William Dettwyler, Hockessin, Del., assignor to E. I. du Pont de Nemours and Company, Wilmington, Del., a corporation of Delaware
No Drawing. Filed Apr. 5, 1960, Ser. No. 20,030
5 Claims. (Cl. 260—556)

This invention relates to an improved process for nitrosating hydroxy naphthalene compounds having a free position ortho to the OH group. More particularly, this invention deals with the nitrosation of compounds typified by 1-naphthol, 2-naphthol and their nuclear substitution derivatives such as methyl, methoxy, chloro, bromo, nitro, sulfo, sulfamoyl and carboxy derivatives, provided the compound has an unsubstituted position ortho to the OH group.

It is an object of this invention to provide a process wherein compounds of the above type may be nitrosated efficiently and safely without cooling, but is preferably at room temperature or, if desired, at temperatures between 20° and 40° C. Additional objects and achievements of this invention will become apparent as the description proceeds.

The methods practiced in the art hitherto for nitrosating hydroxy compounds generally consisted of treating the organic material to be nitrosated with aqueous solutions of sodium nitrite in the presence of strong acids, particularly mineral acids such as hydrochloric or sulfuric. Such methods had to be carried out at about 0° to 10° C. and the acid had to be fed in slowly to an alkaline reaction mass, as otherwise the process would suffer from the loss of nitrogen oxides. Such undesirable loss of nitrogen oxides would first of all waste part of the nitrite, thereby decreasing the yield of the nitroso compound; furthermore, the excessive formation of these oxides often would cause reaction of the latter with the organic reactants to produce undesirable organic by-products. Altogether then, the employment of mineral acid at room temperature generally bears with it the dangers of low yield and poor quality products.

Now according to this invention, the aforementioned hazards are eliminated, and the process of nitrosation is made susceptible of being carried out at temperatures of 20° to 40° C., if the following modifications are made in the old process:

(a) In lieu of mineral acid, use acetic acid.
(b) Employ a procedure wherein an aqueous solution of an alkali-metal nitrite (usually sodium nitrite) is fed into an aqueous solution or an aqueous suspension of the naphthol compound, the latter being conveniently obtained by first dissolving the naphthol compound in water by the aid of an alkali such as NaOH, and then precipitating the same in finely divided form by acidifying the solution.
(c) The acidification mentioned in condition (b) is preferably effected by the aid of acetic acid, and the quantity of the latter is selected so as to leave in the reaction mass not less than 1.5 moles of free acetic acid per mole of the naphthol compound.
(d) The total quantity of water employed in the nitrosation mass (including that introduced by the sodium nitrite and by the acetic acid, if it is dilute) is calculated so with respect to the quantity of acetic acid employed as to reduce the concentration of the latter in the water content of the reaction mass to not over 15% by weight.

It will be noted from point (c) above that the quantity of free acetic acid in the nitrosation mass is at least 1.5 times as great as the theoretical quantity of acid required according to the equation for this reaction.

The theoretical equation above referred to may be written:

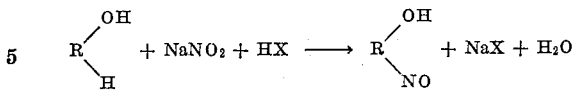

wherein

represents the hydroxy naphthalene compound having an exchangeable H atom ortho to the hydroxy group, while X represents the anion of the acid selected. As already stated, in this invention HX is acetic acid, and 1.5 or more moles thereof, say 1.5 to 4 moles, are employed per mole of the organic compound. Larger quantities of acetic acid, may be employed, but are not necessary.

Without limiting this invention, the following examples are given to illustrate my preferred mode of operation. Parts mentioned are by weight.

*Example 1*

22.3 parts (0.1 mole) of 2-naphthol-6-sulfonamide were dissolved in 200 parts of water conatining 8 parts (0.2 mole) of sodium hydroxide. The amide was then precipitated in finely divided form by adding 24 parts (0.4 mole) of acetic acid. After adding 6.9 parts (0.1 mole) of sodium nitrite as a 30% solution at 20° to 25° C., the nitrosation mass was stirred 2 hours at 25° to 28° C. The yellow product, 1-nitroso-2-naphthol-6-sulfonamide, was filterede off, washed acid-free, and dried. The nitroso compound

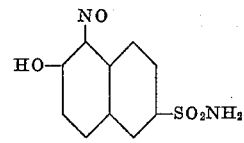

formed yellow needles and was obtained in quantitative yield and in high purity.

When the 2-naphthol-6-sulfonamide in the above example was replaced by 0.1 mole of 2-naphthol-7-sulfonamide or by 0.1 mole of N-methyl-2-naphthol-6-sulfonamide, the corresponding 1-nitroso derivatives were obtained.

*Example 2*

50 parts (0.347 mole) of 2-naphthol were dissolved in 400 parts of water containing 14 parts (0.35 mole) of sodium hydroxide, and 62 parts (1.03 mole) of acetic acid were added to precipitate the 2-naphthol in finely divided form. To this suspension, at 25° to 28° C., were added a solution of 24 parts (0.348 mole) of sodium nitrite in 45 parts of water. The reaction mass was stirred at 25° to 28° C. for 2 to 4 hours. The nitroso compound, 1-nitroso-2-naphthol, precipitated out in yellow needles and was obtained in excellent yield and purity.

When 50 parts of 1-napthhol are used in this example in the place of the 2-naphthol, one obtains the 2-nitroso-1-naphthol. Likewise, 5-bromo-1-naphthol or 5,8-dichloro-1-naphthol may be treated as in this example to produce the correspondingly halogenated 2-nitroso-1-naphthols.

*Example 3*

24.7 parts (0.1 mole) of sodium 2-naphthol-6-sulfonate were dissolved in 300 parts of water and to this solution at 25° to 27° C. were added 12 parts of glacial acetic acid. Then 20 parts of a five-normal solution of sodium nitrite were added, and the solution was stirred for two hours at a temperature between 25° C. and 27° C. A yellow crystalline nitroso compound having the structure

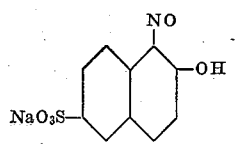

separated and was isolated in a high state of purity by filtration, washing, and drying. Similarly when sodium 1-naphthol-4-sulfonate was used in place of sodium 2-naphthol-6-sulfonate, sodium 2-nitroso-1-naphthol-4-sulfonate was obtained.

*Example 4*

48 parts of disodium 2-napththol-3,6-disulfonate were dissolved in 500 parts of water containing 12 parts of glacial acetic acid. To this mixture at 24° C. were then added 20 parts of a five-normal solution of sodium nitrite, and the reaction mass was stirred overnight. Disodium 1-nitroso-2-naphthol-3,6-disulfonate separated as yellow crystals.

As already indicated, the procedures of the above examples may be applied to substituted naphthols which have a free position ortho to the OH group, and which are free of nuclearly attached amino groups.

As additional instances of compounds of practical interest which may be nitrosated with advantage according to the aforegoing examples may be mentioned 3-hydroxy-2-naphthoic acid,
2-naphthol-6-sulfonic acid,
5-chloro-2-naphthol,
1-naphthol-4-sulfonic acid,
1-naphthol-8-sulfonic acid,
4-methoxy-1-naphthol,
4-nitro-1-naphthol,
1-naphthol-3,8-disulfonamide, and
6-bromo-1-naphthol.

In all these cases, no objectionable liberation of oxides of nitrogen has been observed during the course of my process, and the products were obtained in good yield and high quality. The resulting nitroso compounds are useful as dye intermediates.

In general, any hydroxy naphthalene compound having an OH group in one of its 1,2-positions and an H-atom in the other of said positions may be nitrosated by the improved process of this invention, provided it has no basic substituents, such as amino, which are reactive toward nitrous acid and would therefore compete with the principal reaction desired.

The details of the above examples may be varied within the skill of those engaged in this art. Thus, sodium nitrite has been named in the examples but potasium nitrite is a well-known equivalent. The quantity of nitrite is generally 1 mole per organic OH group. Larger quantities are operative but would be simply wasteful.

My improved process can be run at temperatures below 20° C., but obviously it is more economical not to resort to cooling. Likewise, temperatures up to 40° C. have been tested by me and found operative, but here again simple economy suggests using room temperature.

The advantages of my improved process will now be readily apparent. Because the temperature of reaction is not critical in my process, control of the reaction is easier and results in high yields of high-quality material. The economical factor in omitting cooling to ice temperatures is also significant.

This application is a continuation-in-part of application Serial No. 745,271, filed June 30, 1958, now abandoned.

I claim as my invention:

1. The process of producing an organic nitroso compound which comprises feeding an aqueous solution of an alkali-metal nitrite into an aqueous mass consisting essentially of a naphthalene compound, acetic acid in quantity corresponding to between 1.5 moles and 4 moles per mole of said naphthalene compound, and water in quantity to provide a solution of between 5% and 15% by weight of the said acetic acid, said naphthalene compound being a naphthol selected from the group consisting of 1-naphthol, 2-naphthol and nuclear substitution derivatives of these in which the substituents are located in positions other than 1 and 2 and are members of the group consisting of methyl, methoxy, chloro, bromo, nitro, sulfo, sulfamoyl and carboxy, and allowing the reaction to proceed at a temperature between 20° and 40° C.

2. A process as in claim 1, the naphthalene compound selected being one which is insoluble in water and being present in said aqueous mass in the form of a suspension, said suspension being formed by dissolving said compound in water containing sufficient sodium hydroxide to convert the OH group of the compound into the ONa form, and then precipitating the free OH form by adding acetic acid to the solution of said ONa form.

3. A process as in claim 2, wherein said naphthalene compound is 2-naphthol-6-sulfonamide and the alkali-metal nitrite is sodium nitrite.

4. A process as in claim 2, wherein said naphthalene compound is 2-naphthol and the alkali-metal nitrite is sodium nitrite.

5. A process as in claim 2, wherein said naphthalene compound is 1-naphthol and the alkali-metal nitrite is sodium nitrite.

References Cited in the file of this patent

UNITED STATES PATENTS 2,411,811  Sargent _____ Nov. 26, 1946

OTHER REFERENCES

Michaelis et al.: Berichte der Deut. Chem. Gesell., vol. 25, page 1511 (1892).

Archer: Berichte der Deut. Chem. Gesell., vol 30, pages 1021–1022 (1897).

Fisher et al.: (24) J. Pract. Chem. (2), vol. 94, pages 24–32 (1916).

Fisher et al.: J. Pract. Chem. (2), vol. 94, pages 13–22 (1916).

Fisher et al.: J. Pract. Chem. (2), vol. 94, pages 1–9, (1916).

Elsevier's Encyclopedia of Organic Chemistry, vol. 12B, Elsevier Pub. Co., N.Y., pages 2887–2890, 3010–3011; 3017–3020 (1952).